(12) United States Patent
Martinis et al.

(10) Patent No.: US 12,731,884 B2
(45) Date of Patent: Sep. 8, 2026

(54) ELECTRONIC DEVICE WITH GROUNDED REAR-FACING ANTENNA

(71) Applicant: Apple Inc., Cupertino, CA (US)

(72) Inventors: Mario Martinis, Cupertino, CA (US); Bingzi Liu, Shanghai (CN); Yuko N Kanagy, Sunnyvale, CA (US); Eric T Chiang, San Francisco, CA (US); Zhe Wang, Cupertino, CA (US); Andrea Ruaro, San Jose, CA (US); Dimitrios Papantonis, Cupertino, CA (US); Ahmed Atef Mostafa Mekawy, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 18/654,110

(22) Filed: May 3, 2024

(65) Prior Publication Data

US 2025/0343346 A1 Nov. 6, 2025

(51) Int. Cl.

*H01Q 1/24* (2006.01)
*H01Q 1/27* (2006.01)
*H01Q 1/48* (2006.01)
*H01Q 1/50* (2006.01)
*H02J 50/12* (2016.01)

(52) U.S. Cl.

CPC ............. *H01Q 1/243* (2013.01); *H01Q 1/273* (2013.01); *H01Q 1/48* (2013.01); *H01Q 1/50* (2013.01); *H02J 50/12* (2016.02)

(58) Field of Classification Search

CPC .. H01Q 1/24; H01Q 1/27; H01Q 1/48; H01Q 1/50; H01Q 50/12

See application file for complete search history.

(56) References Cited

U.S. PATENT DOCUMENTS

| | | | | |
|---|---|---|---|---|
| 10,367,252 | B2 | 7/2019 | Ehman et al. | |
| 10,644,383 | B2 | 5/2020 | Da Costa Bras Lima et al. | |
| 10,868,356 | B1 | 12/2020 | Da Costa Bras Lima et al. | |
| 11,349,118 | B2 * | 5/2022 | Shin | H01M 4/525 |
| 11,527,824 | B2 | 12/2022 | Da Costa Bras Lima et al. | |
| 11,575,209 | B2 * | 2/2023 | Garrido Lopez | H01Q 21/28 |
| 11,658,394 | B2 * | 5/2023 | Lim | H01Q 5/342 343/702 |
| 12,046,800 | B2 * | 7/2024 | Jang | H01Q 5/328 |
| 12,272,865 | B2 * | 4/2025 | Lee | G09F 9/30 |
| 12,362,475 | B2 * | 7/2025 | Cho | H01Q 9/42 |

(Continued)

*Primary Examiner* — Thien M Le

(74) *Attorney, Agent, or Firm* — Treyz Law Group, P.C.; Michael H. Lyons

(57) ABSTRACT

An electronic device may have conductive sidewalls and a rear wall. A sensor board may be mounted within a cavity defined by the rear wall. The device may have an antenna with a resonating element that includes a first trace on the rear wall, a second trace on the sensor board, and a conductive interconnect between the first and second traces. A sensor flex may be coupled to the sensor board. The sensor flex may include signal traces that control sensors on the sensor board. The sensor flex may include ground traces coupled to the conductive sidewalls by a conductive interconnect. The ground traces may be coupled to a first grounding point on the first conductive trace and may be coupled to a second grounding point on the second conductive trace. A switch may be disposed on the ground traces for tuning a response of the antenna.

20 Claims, 7 Drawing Sheets

(56) References Cited

U.S. PATENT DOCUMENTS

| | | | | |
|---|---|---|---|---|
| 2013/0257659 | A1* | 10/2013 | Darnell | H05K 1/028<br>343/702 |
| 2019/0393586 | A1* | 12/2019 | Ayala Vazquez | H01Q 5/328 |
| 2023/0420830 | A1 | 12/2023 | Papantonis et al. | |
| 2025/0087873 | A1* | 3/2025 | Poore | H01Q 1/38 |

* cited by examiner

ELECTRONIC DEVICE WITH GROUNDED REAR-FACING ANTENNA

FIELD

This relates generally to electronic devices, including electronic devices with wireless communications capabilities.

BACKGROUND

Electronic devices are often provided with wireless communications capabilities. To satisfy consumer demand for small form factor electronic devices, manufacturers are continually striving to implement wireless circuitry such as antenna components using compact structures.

At the same time, larger antenna volumes generally allow antennas to exhibit greater efficiency bandwidth. In addition, because antennas have the potential to interfere with each other and with other components in a wireless device, care must be taken when incorporating antennas into an electronic device to ensure that the antennas are able to exhibit satisfactory performance over a range of operating frequencies and with satisfactory efficiency bandwidth while still allowing the device to exhibit a compact form factor.

SUMMARY

An electronic device such as a wristwatch may be provided with a housing. The housing may include conductive sidewalls and a rear wall. A display may be mounted to the conductive sidewalls opposite the rear wall. The rear wall may have a first dielectric portion mounted to the conductive sidewalls. The rear wall may have a second dielectric portion that protrudes away from the first dielectric portion and that defines a cavity. A sensor board may be mounted within the cavity. A coil structure may be mounted within the cavity and may laterally surround the sensor board. The coil structure may be used to receive wireless charging signals through the rear wall.

The electronic device may include an antenna that radiates through the rear wall. The antenna may have an antenna ground that includes the conductive sidewalls. The antenna may have a radiating element that includes a first conductive trace on the first dielectric portion of the rear wall and that includes a second conductive trace on the sensor board. The radiating element may include a conductive interconnect that couples the first conductive trace to the second conductive trace.

A sensor flex may be coupled to the sensor board. The sensor flex may include signal traces that control sensors on the sensor board and/or that convey sensor data generated by the sensors. The sensor flex may include ground traces. The ground traces may be coupled to the conductive sidewalls by a conductive interconnect. The ground traces may be coupled to a first grounding point on the first conductive trace and may be coupled to a second grounding point on the second conductive trace. A switch may be disposed on the ground traces for tuning a response of the antenna. Grounding the antenna through the sensor flex may eliminate the need for external grounding clips, which can be excessively bulky.

DETAILED DESCRIPTION

Figure 1:
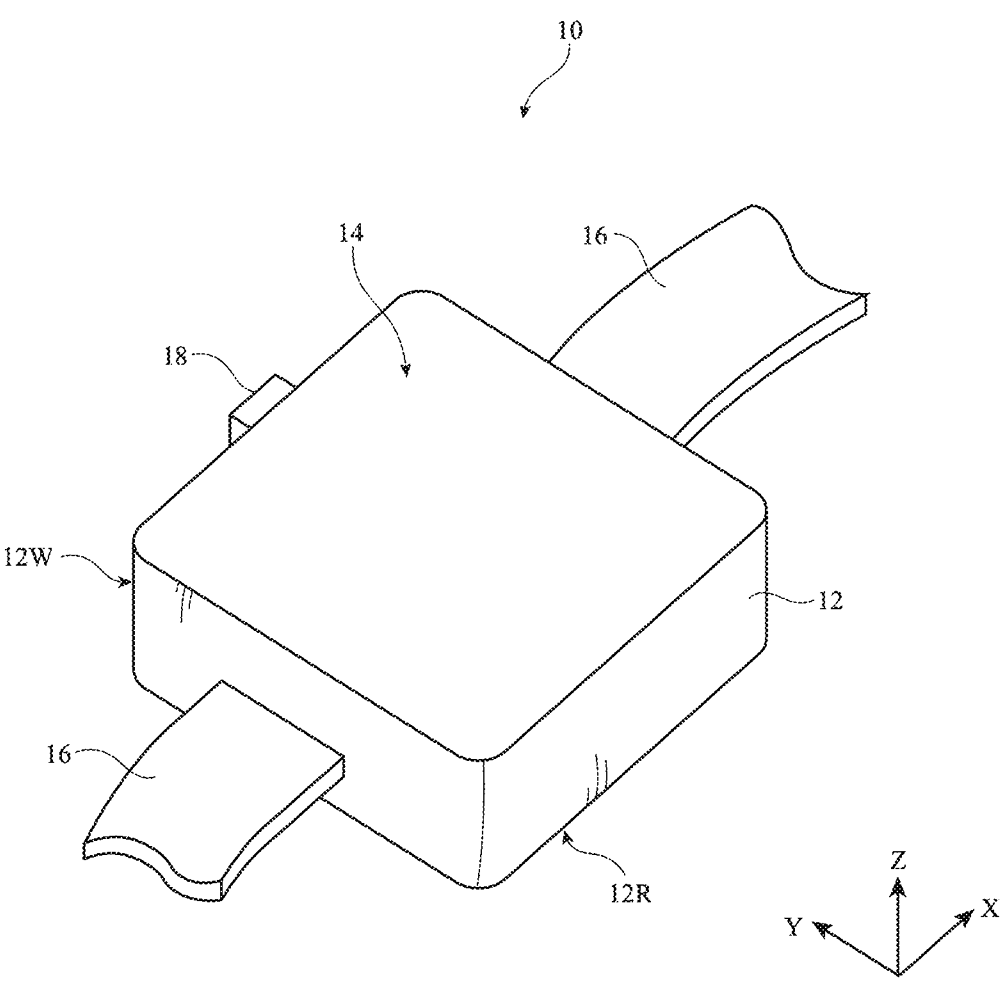
FIG. 1 is a perspective view of an illustrative electronic device with wireless circuitry in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or another small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment. In the illustrative configuration of FIG. 1 and in other examples described herein, device 10 is a portable device such as a wristwatch (e.g., a smart watch). Other configurations may be used for device 10 if desired. The example of FIG. 1 is illustrative and non-limiting.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may include metal sidewalls such as sidewalls 12W or sidewalls formed from other materials. Examples of metal materials that may be used for forming sidewalls 12W include stainless steel, aluminum, silver, gold, titanium, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may include a rear housing wall 12R on the rear side (face) of device 10 opposite the front face of device 10. Conductive housing sidewalls 12W may surround the lateral periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to Z-axis). Conductive housing sidewalls 12W and/or rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

If desired, housing 12 may include one or more dielectric-filled slots. The dielectric-filled slots, sometimes referred to herein as gaps, openings, or splits, may divide the conductive material in housing 12 into different conductive housing portions. The slots may be filled with dielectric material such as plastic, polymer, sapphire, glass, rubber, or ceramic. In one implementation that is described herein as an example, housing 12 may include a slot that extends along three of the four peripheral edges of device 10 and that separates conductive housing sidewalls 12W from a conductive upper portion of housing 12 (sometimes referred to herein as a conductive turret, conductive top portion, conductive ring, or conductive bezel of housing 12) along three sides of device 10. The slot may be used to separate a radiating element in an antenna of device 10 from ground structures in the antenna. This may allow the radiating element to conduct antenna currents along its edges (e.g., at the slot) that produce electric fields associated with the transmission and/or reception of radio-frequency signals.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may also be force sensitive and may gather force input data associated with how strongly a user or object is pressing against display 14.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in implementations where device 10 is a wristwatch device.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides of device 10. Conductive housing sidewalls 12W may include attachment structures for securing wrist strap 16 to housing 12 (e.g., lugs or other attachment mechanisms that configure housing 12 to receive wrist strap 16). Wrist strap 16 may be removable if desired. Configurations that do not include straps may also be used for device 10.

Figure 2:
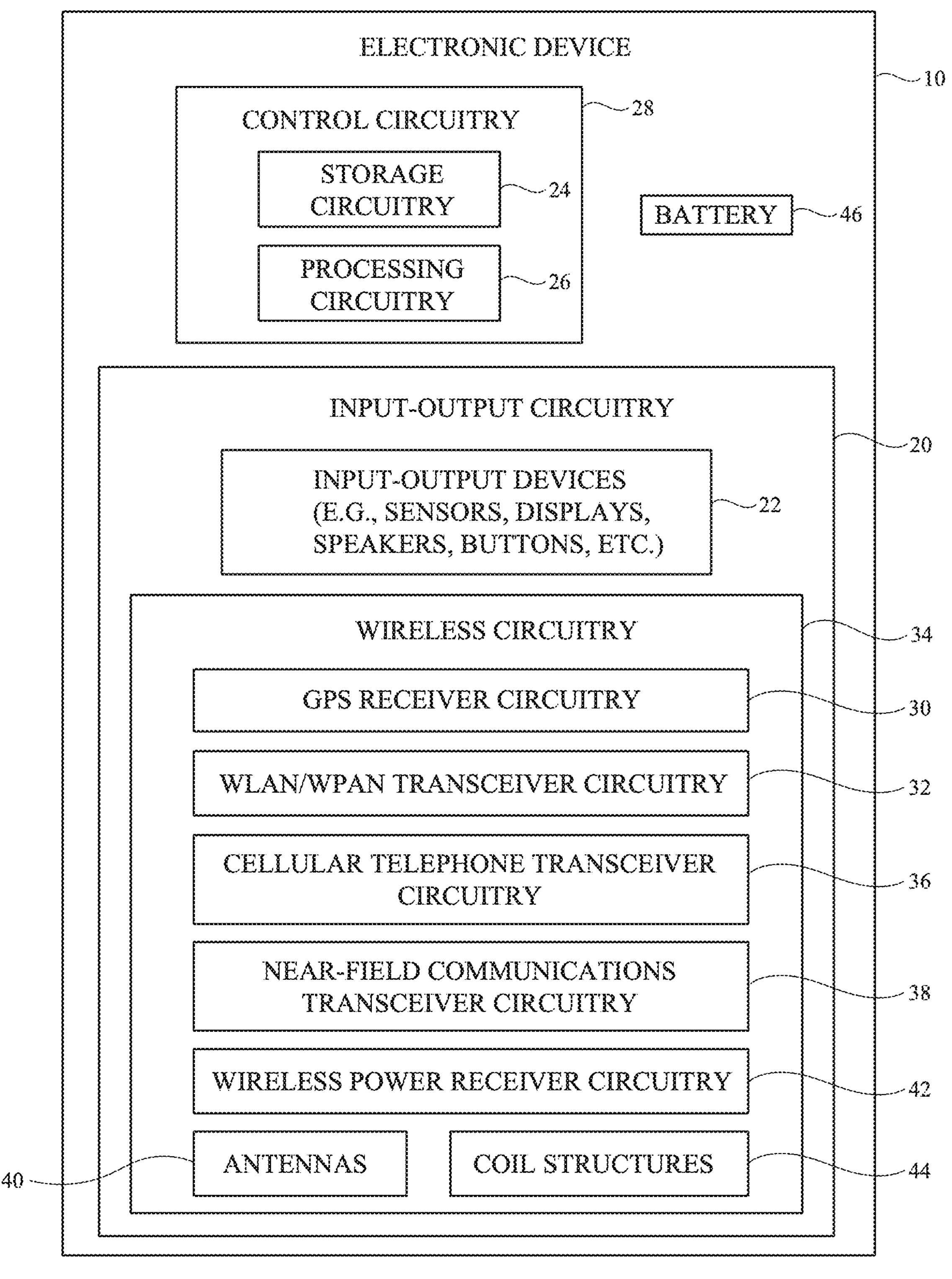
FIG. 2 is a schematic diagram of an illustrative electronic device with wireless circuitry in accordance with some embodiments.

A schematic diagram showing illustrative components that may be included in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more processors such as microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols-sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include wireless power receiving coil structures such as coil structures 44 and wireless power receiver circuitry such as wireless power receiver circuitry 42. Device 10 may use wireless power receiver circuitry 42 and coil structures 44 to receive wirelessly transmitted power (e.g., wireless charging signals) from a wireless power adapter (e.g., a wireless power transmitting device such as a wireless charging mat or other device). Coil structures 44 (sometimes referred to herein as coil 44) may include one or more inductive coils that use resonant inductive coupling (near field electromagnetic coupling) with a wireless power transmitting coil on the wireless power adapter.

The wireless power adapter may pass AC currents through the wireless power transmitting coil to produce a time varying electromagnetic (e.g., magnetic) field that is received as wireless power (wireless charging signals) by coil structures 44 in device 10. An illustrative frequency for the wireless charging signals is 200 kHz. Other frequencies may be used, if desired (e.g., frequencies in the kHz range, the MHz range, or in the GHz range, frequencies of 1 kHz to 1 MHz, frequencies of 1 kHz to 100 MHz, frequencies less than 100 MHz, frequencies less than 1 MHz, etc.). When the time varying electromagnetic field is received by coil structures 44, corresponding alternating-current (AC) currents are induced in the coil structures. Wireless power receiver circuitry 42 may include converter circuitry such as rectifier circuitry. The rectifier circuitry may include rectifying components such as synchronous rectification metal-oxide-semiconductor transistors arranged in a bridge network, and may convert these currents from coil structures 44 into a DC voltage for powering device 10. The DC voltage produced by the rectifier circuitry in wireless power receiver circuitry 42 can be used in powering (charging) an energy storage device such as battery 46 and can be used in powering other components in device 10.

To support wireless communications, wireless circuitry 34 may include baseband circuitry (e.g., one or more baseband processors or other circuitry that operates on baseband signals) and radio-frequency (RF) transceiver circuitry. The transceiver circuitry may include one or more integrated circuits, power amplifier circuitry, low-noise input amplifiers, passive RF components, mixer circuitry, synthesizers, modulators, demodulators, upconverters, downconverters, and/or other transceiver circuitry. Wireless circuitry 34 may also include one or more antennas such as antennas 40, transmission lines, and other circuitry for handling RF wireless signals. One or more radio-frequency front end modules may be disposed along the transmission lines if desired. Wireless signals can also be sent using light (e.g., using infrared communications).

Wireless circuitry 34 may include radio-frequency transceiver circuitry for handling transmission and/or reception of radio-frequency signals within corresponding frequency bands at radio frequencies (sometimes referred to herein as communications bands or simply as "bands"). For example, wireless circuitry 34 may include wireless local area network (WLAN) and wireless personal area network (WPAN) transceiver circuitry 32. Transceiver circuitry 32 may handle a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), a Wi-Fi® 7 or 8 band, and/or other Wi-Fi® bands (e.g., from 1875-5160 MHz or higher). Transceiver circuitry 32 may sometimes be referred to herein as WLAN/WPAN transceiver circuitry 32.

Wireless circuitry 34 may use cellular telephone transceiver circuitry 36 for handling wireless communications in frequency ranges (communications bands) such as a cellular low band (LB) from 600 to 960 MHz, a cellular low-midband (LMB) from 1410 to 1510 MHz, a cellular mid-band (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies, 2G bands, 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz (as examples), 3GPP 6G bands (e.g., at sub-THz frequencies from around 100 GHz to around 1 THz), etc. Cellular telephone transceiver circuitry 36 may handle voice data and non-voice data.

Wireless circuitry 34 may include satellite navigation system circuitry such as Global Positioning System (GPS) receiver circuitry 30. GPS receiver circuitry 30 may receive GPS signals in satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, or other bands. Satellite navigation system signals for receiver circuitry 30 are received from a constellation of satellites orbiting the earth.

Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 38 (e.g., an NFC transceiver operating at 13.56 MHz or another suitable frequency), ultra-wideband transceiver circuitry (e.g., transceiver circuitry that operates at ultra-wideband (UWB) frequency bands under the IEEE 802.15.4 protocol and/or other ultra-wideband communications protocols (e.g., a first UWB communications band at 6.5 GHz and/or a second UWB communications band at 8.0 GHz)), transceiver circuitry that operates using communications bands under the family of 3GPP wireless communications standards, transceiver circuitry that operates using communications bands under the IEEE 802.XX family of standards, transceiver circuitry that operates using industrial, scientific, and medical (ISM) bands such as an ISM band between around 900 MHz and 950 MHz or other ISM bands below or above 1 GHz, transceiver circuitry that operates using one or more unlicensed bands, transceiver circuitry that operates using one or more bands reserved for emergency and/or public services, and/or any other desired frequency bands of interest. Wireless circuitry 34 may also be used to perform spatial ranging operations if desired.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place. Multiple-input and multiple-output (MIMO) schemes and/or carrier aggregation (CA) schemes may be used to boost data rates and wireless performance.

Wireless circuitry 34 may include antennas 40. Antennas 40 may be formed using any desired type of antenna architecture. For example, antennas 40 may include antennas with resonating elements that are formed from patch antenna structures (e.g., shorted patch antenna structures), slot antenna structures, loop antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time).

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. If desired, a combination of antennas for covering multiple frequency bands and dedicated antennas for covering a single frequency band may be used. For example, a first antenna 40 in device 10 may be used to handle communications in a WiFi® or Bluetooth® communication band at 2.4 GHz, a GPS L1 band at 1575 MHz, a GPS L5 band at 1176 MHz, and one or more cellular telephone communications bands such as a cellular midband (MB) from 1710 to 2170 MHz, a cellular high band (HB) from 2300 to 2700 MHZ, whereas a second antenna 40 in device 10 is used to handle communications in a cellular low band (LB) and the cellular HB.

It may be desirable to implement at least some of the antennas in device 10 using portions of electrical components that would otherwise not be used as antennas and that support additional device functions. As an example, it may be desirable to produce antenna currents in components such as display 14 (FIG. 1), so that display 14 and/or other electrical components (e.g., a touch sensor, near-field communications loop antenna, conductive display assembly or housing, conductive shielding structures, etc.) can serve as part of an antenna for Wi-Fi, Bluetooth, GPS, cellular frequencies, and/or other frequencies without the need to incorporate separate bulky antenna structures in device 10. Conductive portions of housing 12 (FIG. 1) may be used to form part of an antenna ground for one or more antennas 40.

While control circuitry 28 is shown separately from wireless circuitry 34 in the example of FIG. 1 for the sake of clarity, wireless circuitry 34 may include processing circuitry (e.g., one or more processors) that forms a part of processing circuitry 26 and/or storage circuitry that forms a part of storage circuitry 24 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio wireless circuitry 34. The baseband circuitry may, for example, access a communication protocol stack on control circuitry 28 (e.g., storage circuitry 24) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

Figure 3:
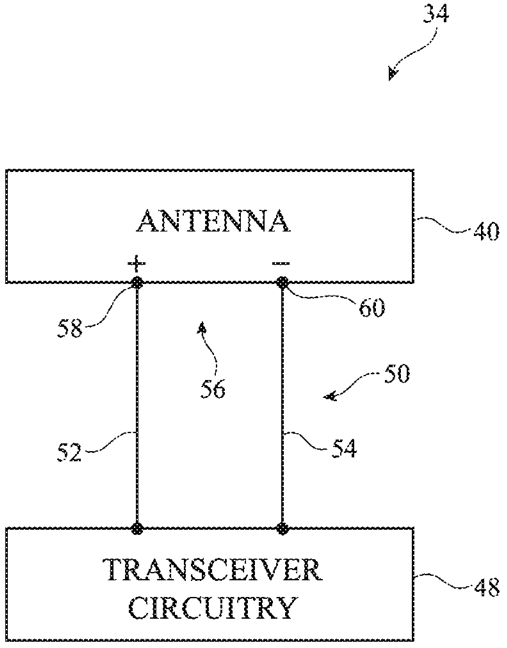
FIG. 3 is a diagram of illustrative wireless circuitry in an electronic device in accordance with some embodiments.

A schematic diagram of wireless circuitry 34 is shown in FIG. 3. As shown in FIG. 3, wireless circuitry 34 may include transceiver circuitry 48 (e.g., cellular telephone transceiver circuitry 36 of FIG. 2, WLAN/WPAN transceiver circuitry 32, etc.) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), microstrip transmission lines (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, a loop antenna, or other antenna having an antenna feed 56 with a positive antenna feed terminal such as terminal 58 and a ground antenna feed terminal such as terminal 60. Positive antenna feed terminal 58 may be coupled to an antenna resonating (radiating) element within antenna 40. Ground antenna feed terminal 60 may be coupled to an antenna ground in antenna 40. Signal conductor 52 may be coupled to positive antenna feed terminal 58 and ground conductor 54 may be coupled to ground antenna feed terminal 60.

Other types of antenna feed arrangements may be used if desired. For example, antenna 40 may be fed using multiple feeds each coupled to a respective port of transceiver circuitry 48 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 48 and the positive antenna feed terminals if desired (e.g., to selectively activate one or more positive antenna feed terminals at any given time). The illustrative feeding configuration of FIG. 3 is merely illustrative.

The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Device 10 may include multiple antennas that convey radio-frequency signals through different sides of device 10. For example, device 10 may include at least first antenna 40 that conveys radio-frequency signals through the front face of device 10 (e.g., display 14 of FIG. 1) and a second antenna 40 that conveys radio-frequency signals through the rear face of device 10 (e.g., rear housing wall 12R of FIG. 1).

Figure 4:
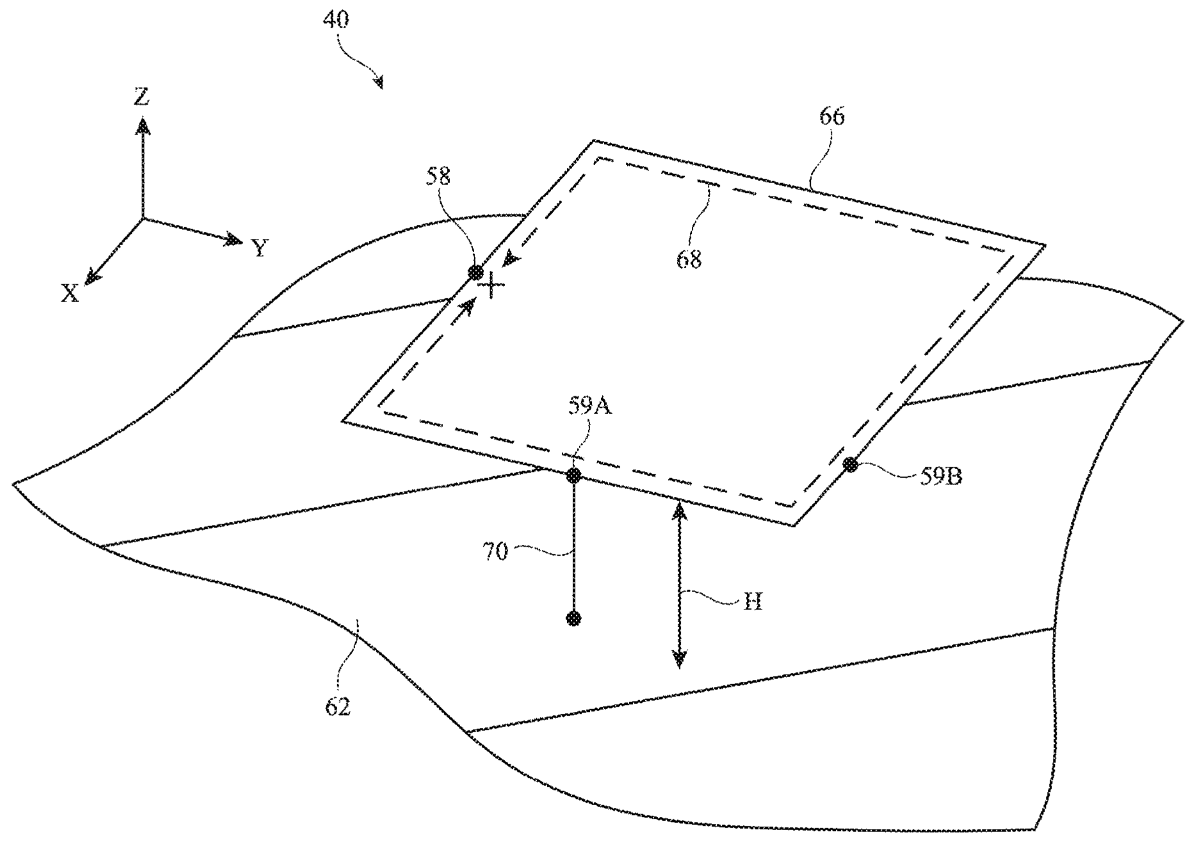
FIG. 4 is a perspective view of an illustrative antenna having a grounded antenna resonating element in accordance with some embodiments.

Any desired antenna structures may be used for implementing the antenna 40 that conveys radio-frequency signals through the rear face of device 10 (sometimes also referred to herein as a rear-facing antenna 40). FIG. 4 is a perspective view showing one example of antenna structures that may be used to implement a rear-facing antenna 40 in device 10.

As shown in FIG. 4, antenna 40 may include an antenna resonating element 66. Antenna resonating element 66 may be vertically separated from and may extend substantially parallel to a ground plane such as antenna ground 62. Antenna resonating element 66 and antenna ground 62 may, for example, be vertically separated by at least a distance H. Antenna ground 62 may be formed from conductive traces patterned onto a dielectric substrate such as a rigid or flexible printed circuit board substrate, metal foil, stamped sheet metal, electronic device housing structures, or any other desired conductive structures (e.g., ground structures).

Antenna resonating element 66 may be formed from conductive traces patterned onto a dielectric housing wall in device 10, conductive traces patterned onto a sensor board (e.g., a rigid or flexible printed circuit board) in device 10, and/or from conductive interconnect structures that couple the conductive traces together, as one example. The length of the sides of antenna resonating element 66 may be selected to configure antenna 40 to resonate (radiate) in one or more desired frequency bands (e.g., over a range of operating frequencies). For example, the sides of antenna resonating element 66 may each have a length that is approximately equal to one-half or one-quarter of the effective wavelength of the signals conveyed by antenna 40 (e.g., where effective wavelength is equal to the free space wavelength multiplied by a constant given by the dielectric properties of the materials surrounding antenna resonating element 66).

Positive antenna feed terminal 58 may be coupled to antenna resonating element 66 (e.g., at, along, or adjacent to a feed edge of antenna resonating element 66). While antenna 40 conveys radio-frequency signals, positive antenna feed terminal 58 may feed radio-frequency antenna current for antenna 40. The antenna current may flow along the perimeter of antenna resonating element 66, as shown by arrow 68. The antenna current may be produced by positive antenna feed terminal 58 (e.g., during signal transmission)

or by incident radio-frequency signals received by antenna 40 (e.g., during signal reception). During signal reception, the antenna current may be passed to transceiver circuitry on device 10 via positive antenna feed terminal 58.

If desired, a return path 70 may electrically couple (e.g., ground or short) one or more points 59 on antenna resonating element 66 to antenna ground 62. Points 59 are sometimes also referred to herein as grounding points 59. This may, for example, serve to tune the frequency response of antenna 40 and/or may help to minimize the footprint of antenna 40 given its frequency band(s) of operation. In practice, grounding different points 59 on antenna resonating element 66 may alter current distribution on antenna resonating element 66 in different ways, which may also alter or tune the frequency response, bandwidth, efficiency, and/or radiation pattern of antenna 40.

For example, coupling return path 70 to point 59A may configure antenna 40 to exhibit a first current distribution, frequency response, bandwidth, efficiency, and/or radiation pattern. On the other hand, coupling return path 70 to point 59B may configure antenna 40 to exhibit a second current distribution, frequency response, bandwidth, efficiency, and/or radiation pattern. If desired, one or more switches may be used to switch return path 70 between points 59A and 59B over time to tune or adjust the current distribution, frequency response, bandwidth, efficiency, and/or radiation pattern of antenna 40 over time (e.g., in a manner that optimizes performance given the present operating conditions of device 10 and/or the frequency resources assigned to antenna 40 for conveying radio-frequency signals).

Antenna resonating element 66 is sometimes also referred to herein as antenna radiating element 66, antenna resonating element arm 66, antenna radiating element arm 66, antenna resonating arm 66, antenna radiating arm 66, radiating arm 66, resonating arm 66, resonating element 66, radiating element 66, antenna arm 66, antenna element 66, resonator 66, radiator 66, arm 66, patch element 66, antenna patch 66, patch 66, radiating patch 66, resonating patch 66, grounded antenna radiating element 66, grounded antenna resonating element arm 66, grounded antenna radiating element arm 66, grounded antenna resonating arm 66, grounded antenna radiating arm 66, grounded radiating arm 66, grounded resonating arm 66, grounded resonating element 66, grounded radiating element 66, grounded antenna arm 66, grounded antenna element 66, grounded resonator 66, grounded radiator 66, grounded arm 66, grounded patch element 66, grounded antenna patch 66, grounded patch 66, grounded radiating patch 66, or grounded resonating patch 66.

The example of FIG. 4 is illustrative and non-limiting. Antenna resonating element 66 may have a substantially square shape in which all of the sides of antenna resonating element 66 are the same length or may have a different rectangular shape. More generally, antenna resonating element 66 may be other shapes having any desired number of straight and/or curved edges (e.g., a round shape, an elliptical shape, a polygonal shape, a square shape with rounded corners, etc.). Antenna 40 may be implemented using other antenna architectures. Antenna resonating element 66 may be formed from multiple conductive structures in device 10 in a manner that serves to integrate antenna resonating element 66 into device 10 while allowing antenna 40 to convey radio-frequency signals through the rear face of device 10 with satisfactory levels of wireless performance.

Figure 5:
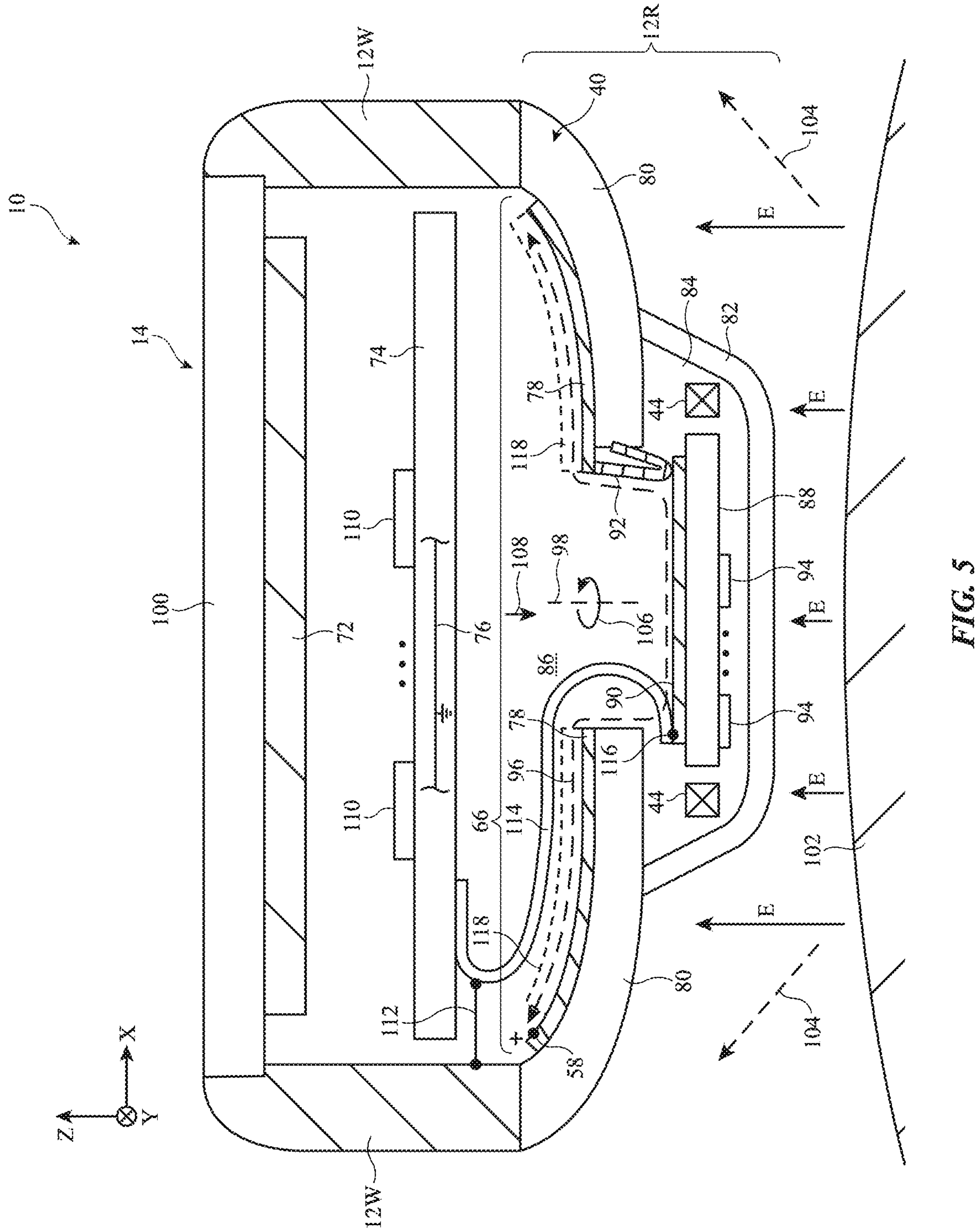
FIG. 5 is a cross-sectional side view of an illustrative electronic device having a grounded antenna resonating element at a rear face of the electronic device in accordance with some embodiments.

FIG. 5 is a cross-sectional side view showing how antenna resonating element 66 may be formed from multiple conductive structures integrated into device 10 for conveying radio-frequency signals through the rear face of device 10. As shown in FIG. 5, display 14 may form the front face of device 10 whereas rear housing wall 12R forms the rear face of device 10. In the example of FIG. 5, rear housing wall 12R is formed from a dielectric material such as glass, sapphire, zirconia, ceramic, or plastic. This is merely illustrative and, if desired, rear housing wall 12R may also include conductive portions (e.g., a conductive frame surrounding one or more dielectric windows in rear housing wall 12R, conductive cosmetic layers, etc.). Conductive housing sidewalls 12W may extend from the rear face to the front face of device 10 (e.g., from rear housing wall 12R to display 14). If desired, conductive housing sidewalls 12W may have a ledge or lip (not shown) that extend onto and/or overlapping rear housing wall 12R (e.g., along the lateral periphery of rear housing wall 12R).

Display 14 may include a display module 72 (sometimes referred to herein as display stack 72, display assembly 72, display board 72, display panel 72, or active area 72 of display 14) and a display cover layer 100. Display module 72 may, for example, form an active area or portion of display 14 that displays images and/or receives touch sensor input. The lateral portion of display 14 that does not include display module 72 (e.g., portions of display 14 formed from display cover layer 100 but without an underlying portion of display module 72) may sometimes be referred to herein as the inactive area or portion of display 14 because this portion of display 14 does not display images or gather touch sensor input.

Display module 72 may include conductive components (sometimes referred to herein as conductive display structures) that are used in forming portions of an antenna that radiates through the front face of device 10 (e.g., an antenna having a radiating element such as a shorted patch element that includes display module 72 and conductive portions of housing 12). Display cover layer 100 may be formed from an optically transparent dielectric such as glass, sapphire, ceramic, or plastic. Display module 72 may display images (e.g., may emit image light) through display cover layer 100 for view by a user and/or may gather touch or force sensor inputs through display cover layer 100. If desired, portions of display cover layer 100 may be provided with opaque masking layers (e.g., ink masking layers) and/or pigment that obscures the interior of device 10 from view of a user.

Substrate 74 (e.g., a rigid or flexible printed circuit board, integrated circuit or chip, system-on-chip (SOC), system in a package (SIP), integrated circuit package, etc.) may be located within the interior of device 10. Substrate 74 may be, for example, a main logic board (MLB) or SIP for device 10. Other components such as components 110 (e.g., components used in forming control circuitry 28, wireless circuitry 34, and/or input-output circuitry 20 of FIG. 2, battery 46, etc.) may be mounted to substrate 74 and/or elsewhere within the interior of device 10.

Rear housing wall 12R may extend across substantially all of the length and width of device 10 (e.g., in the X-Y plane). Rear housing wall 12R may be optically opaque or optically transparent or may include both optically opaque and optically transparent portions (e.g., rear housing wall 12R may include optically transparent windows in an otherwise optically opaque member). In the example of FIG. 5, rear housing wall 12R includes a first dielectric wall 80 and a dielectric protrusion formed from a second dielectric wall 82 that extends vertically downward from first dielectric wall 80. First dielectric wall 80 and second dielectric wall 82 may sometimes also be referred to herein respectively as first and second portions of rear housing wall 12R or first and second dielectric portions of rear housing wall 12R.

First dielectric wall 80 may define part of the interior cavity of device 10. Second dielectric wall 82 may define part of a sensor cavity 84 between first dielectric wall 80 and second dielectric wall 82. First and second dielectric walls 80 and 82 may be formed from ceramic, plastic, glass, sapphire, zirconia, and/or any other desired dielectric materials. First and second dielectric walls 80 and 82 may be formed from respective portions of a single integrated piece of dielectric material or may be formed from separate pieces of dielectric material that have been adhered, joined, fused, attached, secured, or otherwise affixed together at the rear face of device 10.

While the example of FIG. 5 shows a portion of first dielectric wall 80 protruding over sensor cavity 84, this is illustrative and non-limiting. If desired, first dielectric wall 80 may extend continuously into second dielectric wall 82 without extending over sensor cavity 84. First dielectric wall 80 may substantially extend within a first plane. Second dielectric wall 82 may substantially extend within a second plane below the first plane (e.g., parallel to the first plane) and may include sidewalls that couple the portion of second dielectric wall 82 in the second plane to first dielectric wall 80. This is illustrative and, in general, second dielectric wall 82 and thus sensor cavity 84 may have any desired shape.

The protrusion formed by second dielectric wall 82 (e.g., sensor cavity 84) may accommodate one or more components for device 10. For example, a sensor board such as sensor board 88 may be disposed within sensor cavity 84 (e.g., between the first and second planes). Device 10 may have a central axis 98 that extends (e.g., orthogonally) through a lateral surface of sensor board 88. Sensor board 88 may be separated from second dielectric wall 82, may be pressed against second dielectric wall 82, may be adhered to second dielectric wall 82, etc. Sensor board 88 may be disposed entirely within sensor cavity 84 or, if desired, part of sensor board 88 may be disposed above sensor cavity 84 (e.g., within the interior cavity of device 10 at or above the first plane).

Sensor board 88 may include a rigid printed circuit board, flexible printed circuit, integrated circuit chip, integrated circuit package, SOC, SIP, plastic substrate, and/or other substrates that support one or more sensors 94 (e.g., one or more sensors 94 may be mounted to sensor board 88). Sensors 94 may, for example, include sensors in input-output devices 22 of FIG. 2. Sensors 94 may include optical sensors such as one or more optical transmitters and one or more optical receivers. The optical transmitters may transmit optical signals (e.g., visible light, infrared light, etc.) through one or more optically transparent windows or portions of second dielectric wall 82. The optical receivers may receive optical signals through the one or more optically transparent windows or portions of second dielectric wall 82. The optical sensors may, for example, be used to measure a user's vital signs when the user is wearing device 10 on their body. If desired, sensors 94 may include sensor electrodes that protrude through second dielectric wall 82 such as electrocardiogram (ECG or EKG) electrodes. Sensor circuitry on sensor board 88 may sense the electrical activity of a user's heart using the sensor electrodes while the user wears device 10, for example. Sensors 94 may also include one or more sensors such as a light sensor, proximity sensor, touch sensor, or other sensors.

If desired, coil structures 44 may also be disposed within sensor cavity 84 (e.g., between the first and second planes). Coil structures 44 may laterally (circumferentially) surround sensor board 88 and central axis 98. Coil structures 44 may include windings of wire that wrap around central axis 98 and sensor board 88 (e.g., in planes parallel to the X-Y plane), may include one or more windings of wire wrapped around a ferrite core that laterally extends around central axis 98, or may include any other desired inductive coil structures for receiving wireless charging signals. Coil structures 44 may include a single conductive coil (e.g., an inductive coil) or more than one conductive coil. In one suitable arrangement, coil structures 44 may include a first coil with windings that coil (wind) around central axis 98 (e.g., in the direction of arrow 106) and a second coil with windings that extend perpendicular to the windings in the first coil. The windings in the first and second coils may include conductive wire (e.g., copper wire), conductive traces, or any other desired conductive material. In general, coil structures 44 may include any desired number of windings of wire, any desired number of coils, any desired number of ferrite cores, etc. If desired, a ferrite shield structure (not shown) that helps to electromagnetically shield coil structures 44 from other components in device 10 may be layered over coil structures 44. Coil structures 44 may receive wireless charging signals through second dielectric wall 82 (e.g., when device 10 is placed on a wireless power adapter or other wireless power transmitting device). The wireless charging signals may induce currents on coil structures 44 that are used by wireless power receiver circuitry 42 for charging battery 46 (FIG. 2). Antenna 40 may be disposed within device 10 for radiating through rear housing wall 12R. In general, the volume of antenna 40 may be proportional to the efficiency bandwidth of the antenna. Antenna 40 may include an antenna resonating element 66 and an antenna ground (e.g., antenna ground 62 of FIG. 4) separated from antenna resonating element 66 by antenna volume 86. Ground traces 76 may be formed on substrate 74 and may form part of the antenna ground for antenna 40 (e.g., antenna ground 62 of FIG. 4). Conductive housing sidewalls 12W may also form part of the antenna ground for antenna 40 (e.g., ground traces 76 on substrate 74 may be electrically shorted or coupled to conductive housing sidewalls 12W). Conductive portions of other components in device 10 may also form part of the antenna ground for antenna 40 (e.g., ground traces 76 on substrate 74, conductive housing sidewalls 12W, and/or conductive portions of other components in device 10 may be held at a ground or reference potential).

To maximize antenna volume 86, antenna resonating element 66 may be distributed between multiple conductive structures and planes in device 10. As shown in FIG. 5, antenna resonating element 66 may include first conductive traces 78, second conductive traces 90, and conductive interconnect structures 92 (sometimes referred to herein simply as conductive interconnects 92). First conductive traces 78 are sometimes also referred to herein in the singular as first conductive trace 78. Similarly, second conductive traces 90 are sometimes also referred to herein in the singular as second conductive trace 90.

First conductive trace 78 may be layered onto the interior surface of first dielectric wall 80. If desired, a dielectric substrate such as substrate 118 (e.g., a plastic substrate, ceramic substrate, rigid or flexible printed circuit board substrate, etc.) may be layered on top of first conductive trace 78. First conductive trace 78 may be patterned/deposited directly onto the interior surface of first dielectric wall 80 (e.g., using a laser-direct-structuring (LDS) process) or may be patterned/deposited onto the bottom surface of dielectric substrate 118 (e.g., using an LDS process). Alternatively, first conductive trace 78 may be replaced with sheet metal or metal foil that is layered onto the interior surface of first dielectric wall 80 and/or the bottom surface of substrate 118. If desired, dielectric substrate 118 may be pressed against the interior surface of first dielectric wall 80. Alternatively, an air gap may be present between first conductive trace 78 and first dielectric wall 80. If desired, dielectric substrate 118 may be omitted. Second conductive trace 90 may be patterned, deposited, and/or layered onto a surface of sensor board 88. Alternatively, second conductive trace 90 may be patterned onto a flexible printed circuit that is layered onto sensor board 88.

Conductive interconnect structures 92 may couple first conductive trace 78 on first dielectric wall 80 to second conductive trace 90 on sensor board 88 (e.g., at one or more locations around central axis 98). First conductive trace 78 may laterally extend around central axis 98 (e.g., in the direction of arrow 106). To maximize the antenna volume 86 of antenna 40, first conductive trace 78 may extend across all or substantially all of the interior surface of first dielectric wall 80. Similarly, second conductive trace 90 may extend across all or substantially all of the lateral surface of sensor board 88. If desired, a portion of first conductive trace 78 may overlap a portion of second conductive trace 90 (e.g., when viewed in the −Z direction).

Conductive interconnect structures 92 may include conductive springs, conductive pins, metal wires, stamped sheet metal, conductive adhesive or tape, solder, welds, conductive clips, conductive foam, conductive traces (e.g., on an underlying flexible printed circuit), conductive brackets, conductive portions of the housing of device 10, and/or any other desired conductive material that electrically couples first conductive trace 78 to second conductive trace 90. In the example shown in FIG. 5, conductive interconnect structures 92 are illustrated as conductive brackets or clips (e.g., bent pieces of metal) that extend from first conductive trace 78 and that are pressed against second conductive trace 90, which may create a robust and stable electrical connection between first conductive trace 78 and second conductive trace 90.

Positive antenna feed terminal 58 may be coupled to first conductive trace 78. Corresponding antenna currents may flow along first conductive trace 78, through conductive interconnect structures 92, and along second conductive trace 90 as shown by arrow 96. In this way, first conductive trace 78, second conductive trace 90, and conductive interconnect structure 92 may collectively form the antenna resonating element 66 of antenna 40. First conductive trace 78, second conductive trace 90, and conductive interconnect structures 92 may resonate/radiate at radio frequencies to convey radio-frequency signals through rear housing wall 12R.

Distributing antenna resonating element 66 across both the interior surface of first dielectric wall 80 and sensor board 88 within sensor cavity 84 in this way (e.g., using conductive interconnect structures 92) may serve to maximize the antenna volume 86 of antenna 40 and thus its efficiency bandwidth. By disposing coil structures 44 within sensor cavity 84 below first conductive trace 78, coil structures 44 are disposed within device 10 but outside (external to) antenna volume 86. In other words, antenna currents may flow along antenna resonating element 66 (e.g., as shown by arrow 96) without crossing the plane of coil structures 44. This may prevent coil structures 44 from interfering with the transmission and/or reception of radio-frequency signals by antenna 40 while coil structures 44 receive wireless charging signals and/or while coil structures 44 are inactive, thereby maximizing the wireless performance of antenna 40. This may also help to prevent antenna 40 from interfering with the reception of wireless charging signals by coil structures 44, thereby maximizing wireless charging performance. By disposing antenna 40 at rear housing wall 12R in this way, the vertical height of device 10 (e.g., parallel to the Z-axis of FIG. 4) may be shorter than would otherwise be possible in scenarios where the corresponding antenna resonating element is located elsewhere on device 10 (while still allowing antenna 40 to exhibit satisfactory antenna efficiency).

In practice, the wireless performance of antenna 40 may be optimized by the presence of an external object adjacent to rear housing wall 12R. For example, the presence of the user's wrist 102 adjacent to rear housing wall 12R when the user is wearing device 10 may enhance the wireless performance of antenna 40. During operation, antenna 40 may transmit and/or receive radio-frequency signals having electric fields (E) that are oriented normal to the surfaces of rear housing wall 12R and wrist 102. These signals may sometimes be referred to as surface waves, which are then propagated along the surface of wrist 102 and outwards, as shown by paths 104 (e.g., antenna resonating element 66 and wrist 102 may serve as an electromagnetic waveguide that directs the surface waves outwards). This may allow the radio-frequency signals conveyed by antenna 40 to be properly received by external communications equipment (e.g., a wireless access point or base station) even though antenna 40 is located close to wrist 102 and typically pointed away from the external communications equipment.

Sensor board 88 may be coupled to a flexible printed circuit such as sensor flex 114. Sensor flex 114 may couple sensor board 88 to one or more components 110 on substrate 74. Sensor flex 114 may include conductive traces such as signal traces for one or more sensors 94 in sensor board 88. The signal traces may convey control signals, data, and/or power to sensors 94 (e.g., from one or more components 110 on substrate 74) to control and/or drive the operation of sensors 94. Additionally or alternatively, the signal traces may convey sensor data gathered by sensors 94 to one or more components 110 on substrate 74 (e.g., for further processing by one or more processors on substrate 74).

The conductive traces on sensor flex 114 may also include ground traces that are held at a ground potential and/or that are coupled to the system ground of device 10. The ground traces may be coupled to second conductive trace 90 on sensor board 88 at a grounding point such as grounding point 116 (e.g., a given point 59 of FIG. 4). The ground traces may extend through sensor flex 114. A conductive interconnect structure 112 may couple the ground traces on sensor flex 114 to conductive housing sidewalls 12W. Since conductive housing sidewalls 12W are held at a ground potential (e.g., form part of the system ground for device 10), conductive interconnect structure 112 and the ground traces on sensor flex 114 and may form a return path 70 (FIG. 4) between antenna resonating element 66 and antenna ground 62 (FIG. 4) for antenna 40. Conductive interconnect structure 112 may include a conductive spring, conductive pin, metal wire, stamped sheet metal, conductive adhesive or tape, solder, welds, a conductive clip, conductive foam, conductive traces and/or contact pads, a conductive bracket, a conductive via, a conductive portions of conductive housing sidewalls 12W, and/or any other desired conductive material that electrically couples the ground traces on sensor flex 114 to conductive housing sidewalls 12W. If desired, the ground traces may be coupled to multiple locations on conductive housing sidewalls 12W. Grounding antenna resonating element 66 using sensor flex 114 may allow antenna 40 to be grounded without utilizing external grounding components that directly connect first conductive trace 78 to conductive housing sidewalls 12W, which can be excessively bulky and can limit the space inside device 10 for other components.

Figure 6:
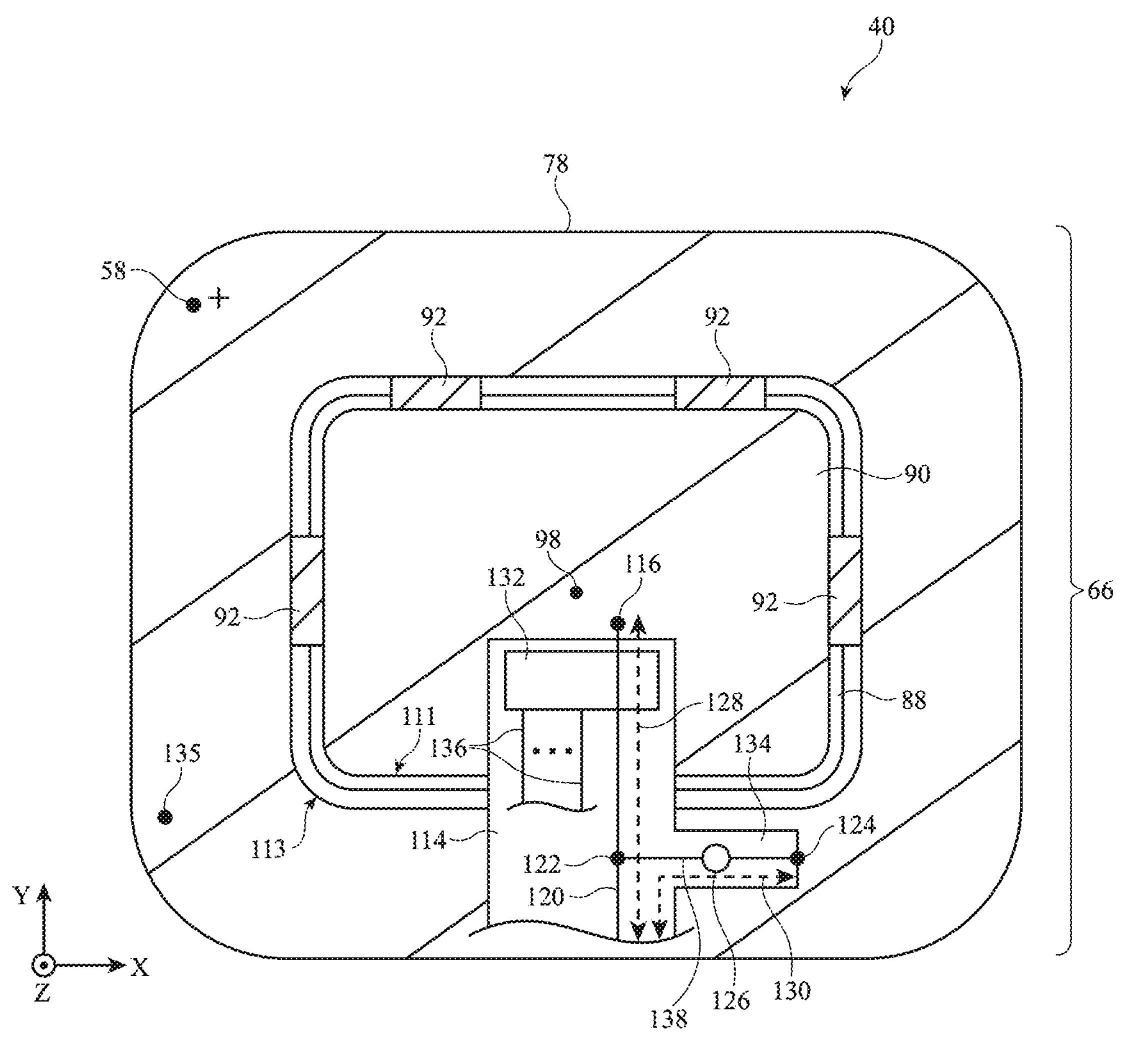
FIG. 6 is a top view of an illustrative grounded antenna resonating element at the rear face of an electronic device in accordance with some embodiments.

If desired, the ground traces on sensor flex 114 may also be coupled to a grounding point on first conductive trace 78 (e.g., to help tune the current distribution, frequency response, bandwidth, efficiency, and/or radiation pattern of antenna 40). FIG. 6 is a top-down view of antenna resonating element 66 (e.g., as viewed in the direction of arrow 108 of FIG. 5) showing one example of how ground traces in sensor flex 114 may be coupled to a grounding point on first conductive trace 78. The other portions of device 10 have been omitted from FIG. 6 for the sake of clarity.

As shown in FIG. 6, antenna resonating element 66 may include first conductive trace 78 on first dielectric wall 80 (FIG. 5), second conductive trace 90 on the underlying sensor board 88, and conductive interconnect structures 92 that couple first conductive trace 78 to second conductive trace 90 (e.g., at multiple points around central axis 98). Central axis 98 may extend through second conductive trace 90 (e.g., parallel to the Z-axis). In general, increasing the number of conductive interconnect structures 92 that couple conductive traces 90 and 78 together may serve to maximize the electrical continuity and thus the overall performance of antenna resonating element 66 (e.g., configuring antenna resonating element 66 to effectively appear as a single continuous conductive patch to antenna current conveyed by positive antenna feed terminal 58).

First conductive trace 78 may have an outer edge. First conductive trace 78 may also have an inner edge 113 opposite the outer edge. Second conductive trace 90 may have an (outer) edge 111. First conductive trace 78 may laterally follow a loop-shaped path around central axis 98 and around second conductive trace 90. Positive antenna terminal 58 may be coupled first conductive trace 78 (e.g., at or adjacent the outer edge of first conductive trace 78). Inner edge 113 of first conductive trace 78 may be laterally separated from edge 111 of second conductive trace 90 (as shown in the example of FIG. 6) or, if desired, first conductive trace 78 may at least partially overlap second conductive trace 90 (e.g., inner edge 113 of first conductive trace 78 may overlap second conductive trace 90 and/or edge 110 of second conductive trace 90 may overlap first conductive trace 78). The example of FIG. 6 is illustrative and non-limiting. The edges of conductive traces 78 and 90 may have other shapes (e.g., having any desired number of curved and/or straight segments). The shapes of conductive traces 78 and 90 may, for example, conform to the lateral shape of device 10.

As shown in FIG. 6, an end of sensor flex 114 may extend over (e.g., may overlap) first conductive trace 78 and second conductive trace 90. Sensor flex 114 may be coupled to sensor board 88 using one or more connectors such as connector 132. Sensor flex 114 may include signal traces 136 that are coupled to connector 132. Signal traces 136 may convey signals, power, and/or data from substrate 74 to sensors 94 (FIG. 5) on sensor board 88 through connector 132 and/or may convey signals and/or data from sensors 94 on sensor board 88 to substrate 74 through connector 132.

Sensor flex 114 may also include ground traces such as ground trace 120. Ground trace 120 may be coupled to grounding point 116 on second conductive trace 90 of sensor board 88 (e.g., through a ground contact in connector 132 or through a conductive interconnect structure separate from connector 132). Ground trace 120 may extend from grounding point 120 and along the length of sensor flex 114 to conductive interconnect structure 112 (FIG. 5), which electrically couples (e.g., grounds or shorts) ground trace 120 to conductive housing sidewalls 12W (FIG. 5).

As shown in FIG. 6, sensor flex 114 may have an extension or protruding portion such as branch 134 (sometimes also referred to herein as tail 134, flex tail 134, flex arm 134, arm 134, or flex branch 134). Branch 134 may overlap first conductive trace 78 (e.g., without overlapping second conductive trace 90). Sensor flex 114 may include an additional ground trace 138 on branch 134. A first end of ground trace 138 may be coupled to ground trace 120 at node 122. An opposing second end of ground trace 138 may be coupled to second conductive trace 78 at grounding point 124. In other words, ground trace 138 may couple ground trace 120 (node 122) to grounding point 124 on first conductive trace 78 through branch 134 of sensor flex 114. Put differently, ground trace 138 may couple grounding point 124 on first conductive trace 78 to the antenna ground (e.g., conductive housing sidewalls 12W of FIG. 5) through ground trace 120 and conductive interconnect structure 112 (FIG. 5). Grounding points 116 and 124 may, for example, form respective points 59A and 59B of FIG. 4 for antenna resonating element 66.

If desired, sensor flex 114 may include an adjustable component such as switch 126. Switch 126 may be disposed on ground trace 138 and may be interposed or coupled between node 122 and grounding point 124. Switch 126 may be surface-mounted to branch 134 of sensor flex 114 or may be disposed elsewhere on sensor flex 114. Switch 126 may have a first state in which switch 126 forms an open circuit (e.g., infinite) impedance between node 122 and grounding point 124 at radio frequencies (e.g., switch 126 may be turned on, closed, active, or enabled in the first state). Switch 126 may have a second state in which switch 126 forms a short circuit (e.g., zero) impedance between node 122 and grounding point 124 at radio frequencies (e.g., switch 126 may be turned off, open, inactive, or disabled in the second state). One or more control lines on sensor flex 114 (not shown) may be coupled to one or more control inputs of switch 126 (e.g., the gate terminal of a transistor in switch 126). The control line(s) may carry a control signal that controls the state of switch 126 (e.g., that places switch 126 in a selected one of the first or second states at a given time, that adjusts switch 126 between the first and second states over time, etc.).

When switch 126 is in the first state, antenna current has a first distribution on antenna resonating element 66, configuring antenna resonating element 66 to exhibit a first frequency response, bandwidth, efficiency, and/or radiation pattern. As shown by arrow 128, antenna current flows between grounding point 116 on second conductive trace 90 and the antenna ground over ground trace 120 (e.g., ground trace 120 and conductive interconnect structure 112 of FIG. 5 form the return path 70 of FIG. 4 for antenna 40).

On the other hand, when switch 126 is in the second state, antenna current has a second distribution on antenna resonating element 66, configuring antenna resonating element 66 to exhibit a second frequency response, bandwidth, efficiency, and/or radiation pattern. As shown by arrow 130, antenna current flows between grounding point 124 on first conductive trace 78 and the antenna ground over ground trace 138 and ground trace 120 (e.g., ground trace 138, ground trace 120, and conductive interconnect structure 112 of FIG. 5 form the return path 70 of FIG. 4 for antenna 40). If desired, at least some antenna current may also flow between grounding point 116 and the antenna ground while switch 126 is in the second state (e.g., the return path for antenna resonating element 66 may be concurrently coupled to both grounding points 116 and 124). By switching switch 126 between the first and second states, control circuitry on device 10 may tune the frequency response, bandwidth, efficiency, and/or radiation pattern of antenna 40. By grounding antenna resonating element 66 through sensor flex 114, external grounding structures such as conductive clips that would otherwise couple point 135 on first conductive trace 78 to ground may be omitted, conserving space in device 10. If desired, switch 126 may be replaced with an antenna tuning component having one or more inductors, capacitors, switches, and/or resistors coupled in series and/or parallel between node 122 and grounding point 124. The inductors, capacitors, switches, and/or resistors may be adjusted over time to tune the frequency response of antenna 40.

Figure 7:
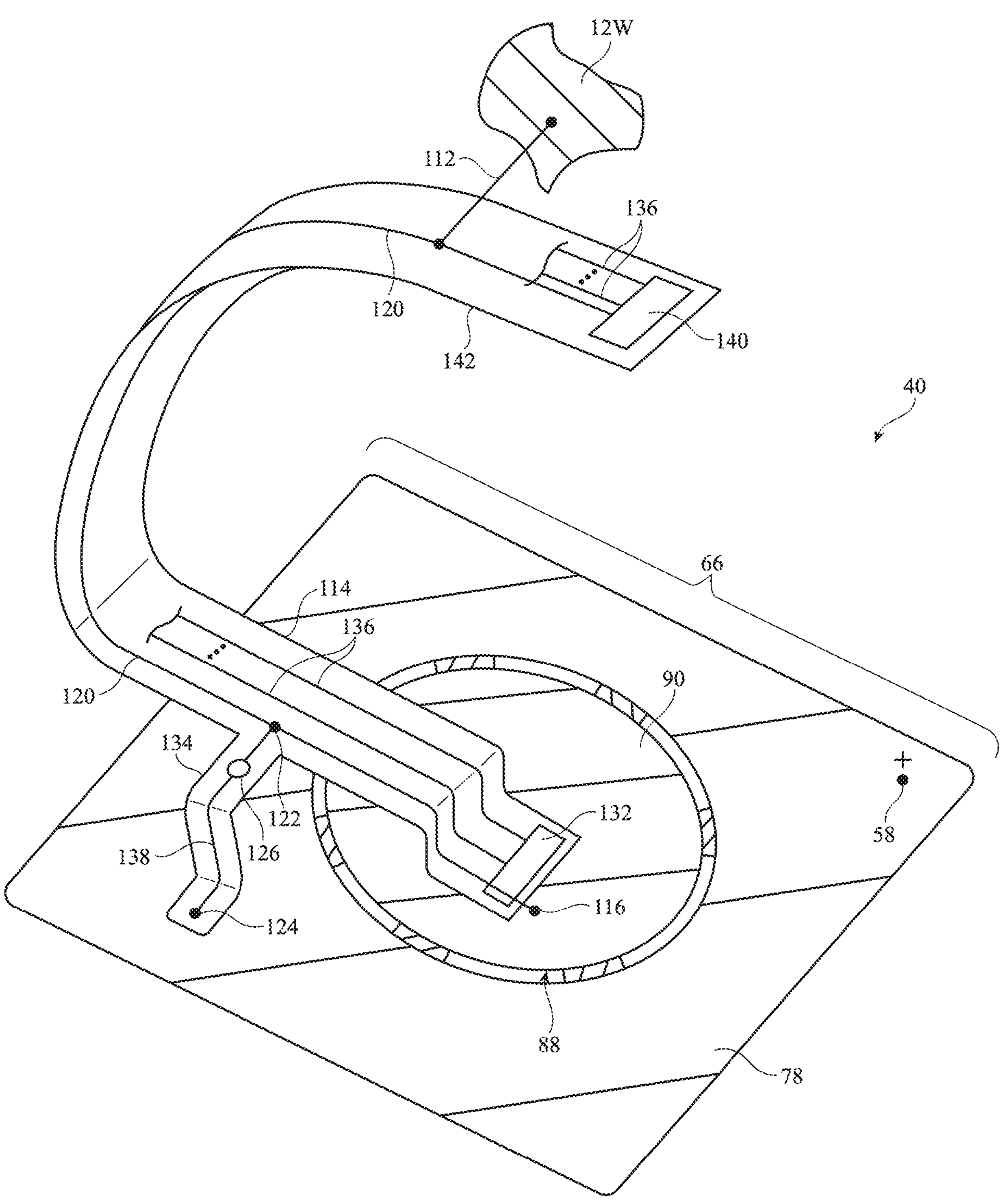
FIG. 7 is a top perspective view of an illustrative grounded antenna resonating element at the rear face of an electronic device in accordance with some embodiments.

FIG. 7 is an top interior perspective view of antenna resonating element 66 and sensor flex 114. As shown in FIG. 7, the end of sensor flex 114 may be folded downwards to couple connector 132 to sensor board 88 and to couple ground trace 120 to grounding point 116 on second conductive trace 90. Branch 134 of sensor flex 114 may be folded downwards to couple ground trace 138 to grounding point 124 on first conductive trace 78. Sensor flex 114 may have a tail 142 that is folded upwards and towards substrate 74 (FIG. 5). Tail 142 may include a connector 140 coupled to signal traces 136. Connector 140 may couple signal traces 136 to a mating connector on substrate 74 (FIG. 5), for example. Ground trace 120 may also extend at least partially into tail 142. Conductive interconnect structure 112 may couple one or more points on ground trace 120 (e.g., within tail 142) to conductive housing sidewalls 12W. If desired, ground trace 120 may also be coupled to connector 140 (e.g., may be coupled, shorted, or grounded to ground traces 76 on substrate 74 of FIG. 5 through connector 140). If desired, sensor flex 114 may include multiple branches such as branch 134 for coupling one or more additional grounding points on first conductive trace 78 and/or second conductive trace 90 to ground trace 120 and/or other ground traces on sensor flex 114.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device having a first face and a second face opposite the first face, the electronic device comprising:
- a display at the first face;
- a housing wall at the second face;
- a first conductive trace on the housing wall;
- a sensor board;
- a second conductive trace on the sensor board;
- an antenna that includes an antenna resonating element configured to radiate through the second face, the antenna resonating element comprising the first conductive trace on the housing wall and the second conductive trace on the sensor board;
- a flexible printed circuit coupled to the sensor board; and
- first and second ground traces on the flexible printed circuit, the first ground trace being coupled to a first grounding point on the first conductive trace, and the second ground trace being coupled to a second grounding point on the second conductive trace.

2. The electronic device of claim 1, further comprising:
- a connector on the flexible printed circuit board and coupled to the sensor board; and
- a signal trace on the flexible printed circuit board and coupled to the connector, the signal trace being configured to convey sensor data generated by the sensor.

3. The electronic device of claim 2, wherein the sensor comprises an optical sensor and the sensor data comprises optical sensor data generated using the optical sensor.

4. The electronic device of claim 2, wherein the sensor comprises an electrocardiogram electrode and the sensor data comprises electrocardiogram data generated using the electrocardiogram electrode.

5. The electronic device of claim 1, the flexible printed circuit comprising:
- a first end that overlaps the sensor board; and
- a branch that overlaps the first conductive trace.

6. The electronic device of claim 5, wherein the first ground trace couples the second ground trace to the first grounding point.

7. The electronic device of claim 6, the flexible printed circuit further comprising:
- a switch disposed on the first ground trace.

8. The electronic device of claim 7, wherein the switch has a first state in which the switch forms an open circuit impedance on the first ground trace and has a second state in which the switch forms a short circuit impedance on the first ground trace.

9. The electronic device of claim 6, further comprising:
- a logic board, wherein the flexible printed circuit has a second end that is coupled to the logic board.

10. The electronic device of claim 9, further comprising:
- a conductive housing sidewall, wherein the display and the housing wall are mounted to the conductive housing sidewall; and
- a conductive interconnect that couples the second ground trace on the flexible printed circuit to the conductive housing sidewall.

11. The electronic device of claim 1, further comprising:
- conductive interconnect structures that couple the first conductive trace to the second conductive trace at a plurality of locations around a central axis of the sensor board.

12. The electronic device of claim 1, further comprising:
a positive antenna feed terminal coupled to the first conductive trace;
a coil extending around the sensor board; and
wireless power receiver circuitry configured to receive wireless charging signals using the coil.

13. The electronic device of claim 12, wherein the housing wall includes a first dielectric portion and a second dielectric portion that protrudes away from the first dielectric portion to define a cavity, the sensor board being disposed at least partially within the cavity.

14. A wristwatch comprising:
a display;
a housing having a dielectric wall opposite the display, the dielectric wall having a protrusion that defines a cavity;
a substrate disposed at least partially within the cavity;
an antenna resonating element that includes a first conductive trace on the dielectric wall, a second conductive trace on the substrate, and a conductive interconnect that couples the first conductive trace to the second conductive trace; and
a flexible printed circuit coupled to the substrate, wherein the flexible printed circuit includes a ground trace that is coupled to a grounding point on the first conductive trace.

15. The wristwatch of claim 14, further comprising:
a sensor on the substrate and configured to generate sensor data through the dielectric wall; and
a signal trace on the flexible printed circuit and configured to convey the sensor data generated by the sensor.

16. The wristwatch of claim 14, wherein the housing includes a conductive sidewall, the display and the dielectric wall are mounted to the conductive sidewall, and the wristwatch further comprises:
a conductive interconnect that couples the ground trace to the conductive sidewall.

17. The wristwatch of claim 14, wherein the ground trace is coupled to an additional grounding point on the second conductive trace.

18. The wristwatch of claim 17, further comprising:
a switch disposed on the ground trace and configured to adjust a current distribution on the antenna resonating element.

19. An antenna comprising:
an antenna ground that includes a conductive sidewall of an electronic device;
an antenna resonating element that includes a first conductive trace on a dielectric housing wall of the electronic device, a second conductive trace on a sensor board in the electronic device, and a conductive interconnect that couples the first conductive trace to the second conductive trace; and
a return path that couples a first point on the first conductive trace to the antenna ground and that couples a second point on the second conductive trace to the antenna ground.

20. The antenna of claim 19, wherein the return path comprises:
a first ground trace on a flexible printed circuit coupled to the sensor board, the first ground trace being coupled to the second point on the second conductive trace;
a second ground trace on the flexible printed circuit board, wherein the second ground trace couples the first ground trace to the first point on the first conductive trace; and
a switch disposed on the second ground trace.

* * * * *